United States Patent [19]

Kawasaki et al.

[11] Patent Number: 5,756,575
[45] Date of Patent: May 26, 1998

[54] ETHYLENE/α-OLEFIN/NONCONJUGATED POLYENE COPOLYMER RUBBER COMPOSITION

[75] Inventors: Masaaki Kawasaki; Hidenari Nakahama; Tetsuo Tojo, all of Ichihara; Toshiyuki Tsutsui, Waki-cho; Kyoko Kobayashi, Ichihara; Toshihiro Sagane, Tokyo, all of Japan

[73] Assignee: Mitsui Petrochemical Industries, Ltd., Tokyo, Japan

[21] Appl. No.: 661,989

[22] Filed: Jun. 12, 1996

[30] Foreign Application Priority Data

Jun. 13, 1995 [JP] Japan ................................ 7-146573
Jun. 13, 1995 [JP] Japan ................................ 7-146574

[51] Int. Cl.$^6$ ............................ C08L 23/16; C08L 23/26
[52] U.S. Cl. ......................... 524/525; 525/232; 525/240; 525/313
[58] Field of Search ............................ 525/240, 232, 525/313; 524/525

[56] References Cited

U.S. PATENT DOCUMENTS

| | | | |
|---|---|---|---|
| 3,758,643 | 9/1973 | Fischer | 525/240 |
| 4,130,535 | 12/1978 | Coran et al. | 525/232 |
| 4,212,787 | 7/1980 | Matsuda et al. | 525/240 |
| 4,247,651 | 1/1981 | Matsuda et al. | 525/232 |
| 4,311,628 | 1/1982 | Abdou-Sabet et al. | 525/232 |
| 4,960,829 | 10/1990 | Allen et al. | 525/313 |
| 5,349,005 | 9/1994 | Tanaka | 525/240 |
| 5,449,713 | 9/1995 | Nakahama | 525/240 |

FOREIGN PATENT DOCUMENTS

| | | |
|---|---|---|
| 59-30376 | 7/1984 | Japan. |
| 62-938 | 1/1987 | Japan. |
| 62-59139 | 12/1987 | Japan. |

OTHER PUBLICATIONS

Database WPI, Section Ch. Week 9406, Derwent Publications, Ltd., London, UK, Abstract of Japanese Laid-Open Patent Appln. No. 6-001887 (Jan. 11, 1994).

Database WPI, Section Ch. Week 9406, Derwent Publications, Ltd., London, UK, Abstract of Japanese Laid-Open Patent Appln. No. 6-001896 (Jan. 11, 1994).

Database WPI, Section Ch. Week 3430, Derwent Publications Ltd., London, UK, Abstract of Japanes Laid-Open Patent Appln. No. 6-179722 (Jun. 28, 1994).

Coran, et al., "Rubber-Thermoplastic Compositions . . . ", Rubber Chemistry And Technology, vol. 53, pp. 141-150 (1990).

*Primary Examiner*—Tae Yoon
*Attorney, Agent, or Firm*—Sherman and Shalloway

[57] ABSTRACT

The ethylene/α-olefin/nonconjugated polyene copolymer rubber composition of the present invention comprises in specified proportions a crystalline polyolefin resin (A) and an ethylene/α-olefin/nonconjugated polyene copolymer rubber (B) composed of ethylene, an α-olefin having 3 to 20 carbon atoms and a specific branched chain polyene compound. The molar ratio of ethylene units to α-olefin units, iodine value and intrinsic viscosity [η] of the ethylene/α-olefin/nonconjugated polyene copolymer rubber (B) are within respective specified ranges. This rubber composition is excellent in low temperature properties. When the above olefinic thermoplastic elastomer composition is partially or entirely crosslinked, a molding can be provided which is superior to the conventional vulcanized rubbers in low temperature properties, tensile strength, elongation at break and rubber properties.

8 Claims, No Drawings

1

ETHYLENE/α-OLEFIN/NONCONJUGATED POLYENE COPOLYMER RUBBER COMPOSITION

FIELD OF THE INVENTION

The present invention relates to an ethylene/α-olefin/nonconjugated polyene copolymer rubber composition. More particularly, the present invention is concerned with an olefinic thermoplastic elastomer composition which enables providing a molding having excellent tensile strength, elongation at break and rubber elasticity and with a crystalline polyolefin resin composition which comprises a crystalline polyolefin resin and an ethylene copolymer rubber and which enables providing a molding being excellent in not only rigidity and heat resistance but also impact resistance, especially, impact resistance at low temperatures.

BACKGROUND OF THE INVENTION

The olefinic thermoplastic elastomer is now widely used in, for example, automobile parts, industrial machine parts, electronic and electrical equipment parts and building materials as an elastomer capable of energy saving and resource saving, especially, as a substitute for vulcanized rubber.

The olefinic thermoplastic elastomer can be divided into the crosslinked type and the noncrosslinked type. The thermoplastic elastomer of the noncrosslinked type ensures little product quality dispersion and lowered production cost because it is not subjected to any crosslinking reaction. However, in performance comparison, the olefinic thermoplastic elastomer of the crosslinked type is superior to the olefinic thermoplastic elastomer of the noncrosslinked type in respect of tensile strength and elongation at break or rubber properties (for example, elongation set and compression set) and heat resistance. This is widely known, which is described in detail in A. Y. Coran et al., Rubber Chemistry and Technology, vol. 53 (1980), p141.

The olefinic thermoplastic elastomer of the noncrosslinked or partially crosslinked type is described in a multiplicity of publications including Japanese Patent Publication Nos. 53(1978)-21021, 55(1980)-18448, 56(1981)-15741, 56(1981)-15742, 58(1983)-46138, 58(1983)-56575, 59(1984)-30376, 62(1987)-938 and 62(1987)-59139.

As mentioned above, the olefinic thermoplastic elastomer can be divided into the crosslinked type and the noncrosslinked type. With respect to the thermoplastic elastomer of the noncrosslinked type, it is desired to achieve the development of an olefinic thermoplastic elastomer composition which enables providing a molding being excellent in tensile strength, elongation at break, rubber properties (for example, elongation set and compression set), heat resistance and low temperature properties as compared with those of the conventional noncrosslinked thermoplastic elastomers. On the other hand, with respect to the thermoplastic elastomer of the crosslinked type, it is desired to achieve the development of an olefinic thermoplastic elastomer composition capable of providing a molding which is superior to the conventional vulcanized rubbers in low temperature properties, tensile strength, elongation at break and rubber properties.

Meanwhile, the molding of a polyolefin resin such as polyethylene or polypropylene has high rigidity and heat resistance, so that it finds a wide spectrum of uses.

Out of various polyolefin resins, however, polypropylene is crystalline and has high glass transition temperature, so that any polypropylene molding has poor impact resistance, especially, at low temperatures. Thus, the application field thereof has been limited.

For improving the impact resistance of the polypropylene molding, a method has been employed in which polypropylene is blended with polyethylene or a rubbery substance such as polyisobutylene, polybutadiene or an amorphous ethylene/propylene copolymer. Among the materials blended into polypropylene, frequent use is made of an amorphous or lowly crystalline ethylene/propylene random copolymer.

With respect to the composition composed of the above amorphous or lowly crystalline ethylene/propylene random copolymer and polypropylene, the impact resistance improving effect of the amorphous or lowly crystalline ethylene/propylene random copolymer is low, so that it must be blended into the polypropylene composition in a large amount for attaining a significant improvement of the impact resistance of the polypropylene molding.

Although the impact resistance of the molding from the polypropylene composition is significantly improved, the use of the ethylene/propylene random copolymer in a large amount causes another problem that the rigidity and heat resistance inherently possessed by polypropylene is gravely deteriorated. On the other hand, when it is intended to retain the rigidity and heat resistance inherently possessed by polypropylene by reducing the amount of ethylene/propylene random copolymer blended in the polypropylene composition, the problem that the improvement of the impact resistance at low temperatures is not satisfactory is raised.

Therefore, it is desired to achieve the development of a crystalline polyolefin resin composition which enables obtaining a polyolefin molding being excellent in not only rigidity and heat resistance but also impact resistance, especially, at low temperatures.

As apparent from the above, the olefinic thermoplastic elastomer and the crystalline polyolefin resin composition have the common problem of low temperature properties.

OBJECT OF THE INVENTION

The object of the present invention is to provide an ethylene/α-olefin/nonconjugated polyene copolymer composition (olefinic thermoplastic elastomer composition and crystalline polyolefin resin composition) which enables forming a molding being excellent in low temperature properties.

Specifically, an object of the present invention is to provide an olefinic thermoplastic elastomer composition which, even when being of the noncrosslinked type, enables providing a molding being excellent in tensile strength, elongation at break, rubber properties, heat resistance and low temperature properties and which, when being of the crosslinked type, enables providing a molding which is superior to the conventional vulcanized rubbers in low temperature properties, tensile strength, elongation at break and rubber properties. Another object of the present invention is to provide a crystalline polyolefin resin composition, especially, a crystalline polypropylene resin composition which enables obtaining a polyolefin molding being excellent in not only rigidity and heat resistance but also impact resistance, especially, at low temperatures.

SUMMARY OF THE INVENTION

An ethylene/α-olefin/nonconjugated polyene copolymer rubber composition of the present invention comprises 10 to 95 parts by weight of a crystalline polyolefin resin (A) and 90 to 5 parts by weight of an ethylene/ α-olefin/ nonconjugated polyene copolymer rubber (B) in which the sum of components (A) and (B) is 100 parts by weight, said ethylene/α-olefin/nonconjugated polyene copolymer rubber (B) being composed of ethylene, an α-olefin having 3 to 20 carbon atoms and at least one branched chain polyene compound represented by the following general formula [I]:

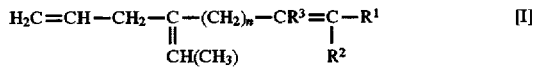

wherein n is an integer of 1 to 5, $R^1$ represents an alkyl group having 1 to 5 carbon atoms, and each of $R^2$ and $R^3$ independently represents a hydrogen atom or an alkyl group having 1 to 5 carbon atoms, and said ethylene/α-olefin/nonconjugated polyene copolymer rubber (B) being characterized by:
(i) having a molar ratio ethylene (units) to an α-olefin (units) having 3 to 20 carbon atoms (ethylene/α-olefin) of 40/60 to 95/5,
(ii) exhibiting an iodine value of 1 to 40, and
(iii) having an intrinsic viscosity [η] measured in 135° C. decalin which satisfies the inequality:

0.8 dl/g<[η]<5.0 dl/g.

Examples of the above ethylene/α-olefin/nonconjugated polyene copolymer rubber compositions according to the present invention include the following olefinic thermoplastic elastomer composition and crystalline polyolefin resin composition. (1) The olefinic thermoplastic elastomer composition of the present invention comprises 10 to less than 60 parts by weight of a crystalline polyolefin resin (A) and 90 to more than 40 parts by weight of the above ethylene/α-olefin/nonconjugated polyene copolymer rubber (B) in which the sum of components (A) and (B) is 100 parts by weight.

This thermoplastic elastomer composition may further comprise 2 to 100 parts by weight of a softener (C) and/or 2 to 50 parts by weight of an inorganic filler (D) per 100 parts by weight of the sum of the crystalline polyolefin resin (A) and the ethylene/α-olefin/nonconjugated polyene copolymer rubber (B). (2) The crystalline polyolefin resin composition of the present invention comprises 95 to 60 parts by weight of a crystalline polyolefin resin (A) and 5 to 40 parts by weight of the above ethylene/α-olefin/ nonconjugated polyene copolymer rubber (B) in which the sum of components (A) and (B) is 100 parts by weight.

This crystalline polyolefin resin composition may further comprise 5 to 15 parts by weight of an amorphous propylene/ethylene random copolymer (E) per 100 parts by weight of the sum of the crystalline polyolefin resin (A) and the ethylene/α-olefin/nonconjugated polyene copolymer rubber (B).

The olefinic thermoplastic elastomer composition (1), even when being of the noncrosslinked type, can provide a molding being excellent in low temperature properties, tensile strength, elongation at break, rubber properties and heat resistance. Further, the olefinic thermoplastic elastomer composition of the present invention, when being of the partially or entirely crosslinked type, can provide a molding which is superior to the conventional vulcanized rubbers in low temperature properties, tensile strength, elongation at break and rubber properties.

Still further, the crystalline polyolefin resin composition (2), especially, crystalline polypropylene resin composition according to the present invention can provide a polyolefin molding being excellent in not only rigidity and heat resistance but also impact resistance, especially, at low temperatures.

DETAILED DESCRIPTION OF THE INVENTION

An ethylene/α-olefin/nonconjugated polyene copolymer rubber composition of the present invention will be described in detail below.

The ethylene/α-olefin/nonconjugated polyene copolymer rubber composition of the present invention comprises a crystalline polyolefin resin (A) and an ethylene/α-olefin/ nonconjugated polyene copolymer rubber (B).

The olefinic thermoplastic elastomer composition (1) according to the present invention is either a noncrosslinked thermoplastic elastomer composition or a partially or entirely crosslinked thermoplastic elastomer composition and comprises the crystalline polyolefin resin (A) and the ethylene/α-olefin/nonconjugated polyene copolymer rubber (B).

Also, the crystalline polyolefin resin composition (2) according to the present invention comprises the crystalline polyolefin resin (A) and the ethylene/α-olefin/ nonconjugated polyene copolymer rubber (B).

Crystalline Polyolefin Resin (A)

The crystalline polyolefin resin (A) for use in the present invention comprises a crystalline solid product of high molecular weight obtained by polymerizing at least one monoolefin according to either the high pressure process or the low pressure process. Examples of the above resins include isotactic and syndiotactic polymonoolefin resins. Representative resins of these are commercially available.

Examples of starting olefins suitable for preparing the above crystalline polyolefin resin (A) include ethylene, propylene, 1-butene, 1-pentene, 1-hexene, 1-octene, 1-decene, 3-methyl-1-butene, 2-methyl-1-propene, 3-methyl-1-pentene, 4-methyl-1-pentene, 5-methyl-1-hexene, 3-methyl-1-hexene, vinylcyclopentene, vinylcyclohexene and vinylnorbornene. These olefins are used either individually or in combination.

Propylene or an olefin mixture composed of propylene and another olefin is preferably used in the preparation of the crystalline polyolefin resin composition (2). That is, the crystalline polyolefin resin (A) for use in the present invention is preferably a polypropylene. Examples of the polypropylenes include propylene homopolymer and propylene/α-olefin copolymers containing structural units derived from an α-olefin other than propylene in an amount of not greater than 10 mol%. The α-olefins set forth above may be used as the α-olefin for constituting the propylene/α-olefin copolymer.

The employed polymerization method may be a random polymerization or a block polymerization, but it is not particularly limited as long as a resinous material can be obtained.

The crystalline polyolefin resin (A) for use in the olefinic thermoplastic elastomer composition (1) is preferred to exhibit an MFR (melt flow rate measured at 230° C. in accordance with ASTM D 1238-65T) of, generally, 0.01 to 100 g/10 min and, especially, 0.05 to 50 g/10 min.

The crystalline polyolefin resin (A) for use in the crystalline polyolefin resin composition (2) is preferred to exhibit an MFR (melt flow rate measured at 230° C. under a load of 2.16 kg in accordance with ASTM D 1238) of, generally, 0.01 to 200 g/10 min, preferably, 0.05 to 100 g/10 min and, more preferably, 0.1 to 100 g/10 min.

The various available crystalline polyolefin resins may be used either individually or in combination.

The crystalline polyolefin resin (A) bears the function of improving the fluidity and heat resistance of the composition.

In the present invention, the crystalline polyolefin resin (A) is used in an amount of 10 to 95 parts by weight per 100 parts by weight of the sum of the crystalline polyolefin resin (A) and the ethylene/α-olefin/nonconjugated polyene copolymer rubber (B).

In the olefinic thermoplastic elastomer composition (1), the crystalline polyolefin resin (A) is used in an amount of 10 to less than 60 parts by weight and, preferably, 20 to 55 parts by weight per 100 parts by weight of the sum of the crystalline polyolefin resin (A) and the ethylene/α-olefin/ nonconjugated polyene copolymer rubber (B).

The use of the crystalline polyolefin resin (A) in the above amount enables obtaining an olefinic thermoplastic elastomer composition which is excellent in not only rubber elasticity but also moldability.

In the crystalline polyolefin resin composition (2), the crystalline polyolefin resin (A) is used in an amount of 95 to 60 parts by weight and, preferably, 85 to 65 parts by weight per 100 parts by weight of the sum of the crystalline polyolefin resin (A) and the ethylene/α-olefin/ nonconjugated polyene copolymer rubber (B).

Ethylene/α-Olefin/Nonconjugated Polyene Copolymer Rubber (B)

The ethylene/α-olefin/nonconjugated polyene copolymer rubber (B) for use in the present invention is a random copolymer rubber and is composed of ethylene, an α-olefin having 3 to 20 carbon atoms and a branched chain polyene compound.

Various α-olefins each having 3 to 20 carbon atoms which may suitably be employed include, for example, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. Of these, propylene, 1-butene, 1-hexene and 1-octene are preferred.

These α-olefins may be used either individually or in combination.

The branched chain polyene compound is represented by the following general formula:

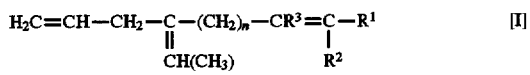

[I]

In the formula [I], n is an integer of 1 to 5, $R^1$ represents an alkyl group having 1 to 5 carbon atoms, and each of $R^2$ and $R^3$ independently represents a hydrogen atom or an alkyl group having 1 to 5 carbon atoms.

Examples of the alkyl groups each having 1 to 5 carbon atoms include methyl, ethyl, n-propyl, i-propyl, n-butyl, i-butyl, sec-butyl, t-butyl, n-pentyl and i-pentyl groups.

Examples of the above branched chain polyene compounds (hereinafter also referred to as the branched chain polyene compound [I]) include the following compounds (1) to (24):

(1) 4-ethylidene-1,6-octadiene,
(2) 7-methyl-4-ethylidene-1,6-octadiene,
(3) 7-methyl-4-ethylidene-1,6-nonadiene,
(4) 7-ethyl-4-ethylidene-1,6-nonadiene,
(5) 6,7-dimethyl-4-ethylidene-1,6-octadiene,
(6) 6,7-dimethyl-4-ethylidene-1,6-nonadiene,
(7) 4-ethylidene-1,6-decadiene,
(8) 7-methyl-4-ethylidene-1,6-decadiene,
(9) 7-methyl-6-propyl-4-ethylidene-1,6-octadiene,
(10) 4-ethylidene-1,7-nonadiene,
(11) 8-methyl-4-ethylidene-1,7-nonadiene (EMN),
(12) 4-ethylidene-1,7-undecadiene,
(13) 8-methyl-4-ethylidene-1,7-undecadiene,
(14) 7,8-dimethyl-4-ethylidene-1,7-nonadiene,
(15) 7,8-dimethyl-4-ethylidene-1,7-decadiene,
(16) 7,8-dimethyl-4-ethylidene-1,7-undecadiene,
(17) 8-methyl-7-ethyl-4-ethylidene-1,7-undecadiene,
(18) 7,8-diethyl-4-ethylidene-1,7-decadiene,
(19) 9-methyl-4-ethylidene-1,8-decadiene,
(20) 8,9-dimethyl-4-ethylidene-1,8-decadiene,
(21) 10-methyl-4-ethylidene-1,9-undecadiene,
(22) 9,10-dimethyl-4-ethylidene-1,9-undecadiene,
(23) 11-methyl-4-ethylidene-1,10-dodecadiene, and
(24) 10,11-dimethyl-4-ethylidene-1,10-dodecadiene.

Of these the branched chain polyene compounds (5), (6), (9), (11), (14), (19) and (20) are preferably employed.

These may be used either individually or in combination.

The above branched chain polyene compound [I] may be either a mixture of trans and cis forms or purely a trans or cis form.

The above branched chain polyene compound can be prepared by the process described in the specification of Japanese Patent Application No. 6(1994)-154952 filed by the same applicant as in the present application.

The branched chain polyene compound can be produced by reacting a conjugated diene compound represented by the following formula [I-a] with ethylene in the presence of a catalyst composed of a transition metal compound and an organoaluminum compound:

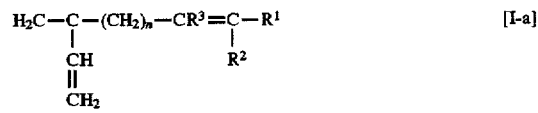

[I-a]

wherein the meanings of n, $R^1$, $R^2$ and $R^3$ are the same as mentioned above with respect to the formula [I].

In the ethylene/α-olefin/nonconjugated polyene copolymer rubber (B) for use in the present invention, the structural units derived from the above monomers of ethylene, α-olefin and branched chain polyene compound are randomly arranged and mutually bonded, a branch structure is present attributed to the branched chain polyene compound and the principal chain has a substantially linear structure.

That this copolymer rubber has a substantially linear structure and contains substantially no gel of crosslinked polymer can be confirmed by the fact that the copolymer rubber is soluble in an organic solvent and contains substantially no insoluble matter. For example, the confirmation can be made by the fact that the copolymer rubber is completely dissolved in decalin at 135° C. in the measurement of the intrinsic viscosity [η].

In this ethylene/α-olefin/nonconjugated polyene copolymer rubber (B), each structural unit derived from the branched chain polyene compound has substantially the structure represented by the formula:

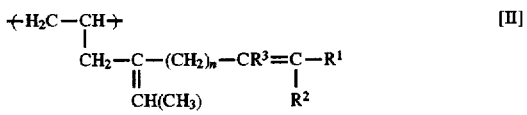

wherein the meanings of n, $R^1$, $R^2$ and $R^3$ are the same as mentioned above with respect to the formula [I].

That each structural unit derived from the branched chain polyene compound has the above structure can be confirmed by obtaining $^{13}$C-NMR spectrum of the copolymer.

The ethylene/α-olefin/nonconjugated polyene copolymer rubber (B) for use in the present invention has the following components and properties.

(i) The ethylene/α-olefin/nonconjugated polyene copolymer rubber (B) has a molar ratio of ethylene units to an α-olefin units having 3 to 20 carbon atoms (ethylene units/α-olefin units) of 40/60 to 95/5, preferably, 50/50 to 90/10 and, still preferably, 55/45 to 85/15.

The ethylene/α-olefin/nonconjugated polyene copolymer rubber of the above ratio of ethylene unit component/α-olefin unit component is excellent in all of the low temperature flexibility, low temperature impact resistance and heat resistance. When the ratio of ethylene unit component/α-olefin unit component exceeds 95/5, the ethylene/α-olefin/nonconjugated polyene copolymer rubber comes to exhibit resin properties, thereby having deteriorated low temperature flexibility. On the other hand, when the ratio of ethylene unit component/α-olefin unit component is less than 40/60, the heat resistance of the ethylene/α-olefin/nonconjugated polyene copolymer rubber tends to be deteriorated.

(ii) The ethylene/α-olefin/nonconjugated polyene copolymer rubber (B) exhibits an iodine value of 1 to 40, preferably, 8 to 35 and, still preferably, 10 to 30.

The use of the ethylene/α-olefin/nonconjugated polyene copolymer rubber (B) exhibiting the above range of iodine value enables obtaining an olefinic thermoplastic elastomer composition or crystalline polyolefin resin composition having high vulcanization rate.

(iii) The ethylene/α-olefin/nonconjugated polyene copolymer rubber (B) has an intrinsic viscosity [η] measured in 135° C. decalin which satisfies the inequality:

$0.8 \text{ dl/g} < [\eta] < 5.0 \text{ dl/g}$.

The use of the ethylene/α-olefin/nonconjugated polyene copolymer rubber (B) having the above range of intrinsic viscosity [η] enables obtaining an olefinic thermoplastic elastomer composition or crystalline polyolefin resin composition having excellent processability.

The above ethylene/α-olefin/nonconjugated polyene copolymer rubber (B) can be obtained by copolymerizing ethylene, an α-olefin having 3 to 20 carbon atoms and a branched chain polyene compound represented by the above general formula [I] in the presence of a catalyst.

A Ziegler catalyst composed of a compound of transition metal, such as vanadium (V), zirconium (Zr) or titanium (Ti), and an organoaluminum compound (organoaluminum oxy compound) may used as the catalyst.

In the present invention, it is especially preferred to use a catalyst (a) composed of a soluble vanadium compound and an organoaluminum compound or a catalyst (b) composed of a metallocene compound of a transition metal selected from among the Group IVB of the periodic table and either an organoaluminum oxy compound or an ionized ionic compound.

In the present invention, generally, ethylene, an α-olefin having 3 to 20 carbon atoms and a branched chain polyene compound are copolymerized in a liquid phase in the presence of the above catalyst (a) (composed of a soluble vanadium compound and an organoaluminum compound) or catalyst (b) (composed of a metallocene compound of a transition metal selected from among the Group IVB of the periodic table and either an organoaluminum oxy compound or an ionized ionic compound).

In the copolymerization, generally, use is made of a hydrocarbon solvent. In place of the hydrocarbon solvent, however, an α-olefin such as propylene may be used as the solvent.

Examples of suitable hydrocarbon solvents include:

aliphatic hydrocarbons such as pentane, hexane, heptane, octane, decane, dodecane and kerosene, and halogenated derivatives thereof, alicyclic hydrocarbons such as cyclohexane, methylcyclopentane and methylcyclohexane, and halogenated derivatives thereof, and aromatic hydrocarbons such as benzene, toluene and xylene, and halogenated derivatives thereof such as chlorobenzene.

These solvents may be used either individually or in combination.

The copolymerization of ethylene, an α-olefin having 3 to 20 carbon atoms and a branched chain polyene compound may be performed in either a batch or a continuous process. In the execution of the copolymerization according to the continuous process, the above catalyst is used in the following concentration.

When use is made of the above catalyst (a), namely, the catalyst composed of a soluble vanadium compound and an organoaluminum compound in the present invention, the concentration of the soluble vanadium compound in the polymerization system ranges generally from 0.01 to 5 mmol/liter (polymerization volume), preferably, from 0.05 to 3 mmol/liter. It is preferred that the soluble vanadium compound be fed in a concentration of not greater than 10 times, especially, 1 to 7 times and, still especially, 1 to 5 times the concentration of the soluble vanadium compound in the polymerization system.

On the other hand, the organoaluminum compound is fed at an atomic ratio of aluminum to vanadium in the polymerization system (Al/V) of at least 2, preferably, 2 to 50 and, still preferably, 3 to 20.

The catalyst (a) composed of the soluble vanadium compound and the organoaluminum compound is generally diluted with the above hydrocarbon solvent and/or liquid α-olefin having 3 to 20 carbon atoms and branched chain polyene compound to be fed in the polymerization system. In this dilution, it is preferred that the soluble vanadium compound be diluted in the above concentration and that the concentration of the organoaluminum compound be regulated to an arbitrary concentration of, for example, not greater than 50 times the concentration in the polymerization system to be fed thereinto.

When use is made of the catalyst (b) composed of a metallocene compound and either an organoaluminum oxy compound or an ionized ionic compound (also referred to as "ionic ionized compound" or "ionic compound") in the present invention, the concentration of metallocene compound in the polymerization system ranges generally from 0.00005 to 0.1 mmol/liter (polymerization volume), preferably, 0.0001 to 0.05 mmol/liter.

The organoaluminum oxy compound is fed at a ratio of aluminum atom to metallocene compound in the polymerization system (atomic ratio of Al/transition metal) of 1 to 10,000, preferably, 10 to 5000.

On the other hand, the ionized ionic compound is fed at a molar ratio of ionized ionic compound to metallocene compound present in the polymerization system (ionized ionic compound/metallocene compound) of 0.5 to 20, preferably, 1 to 10.

When the organoaluminum compound is employed, it is generally used in an amount of about 0 to 5 mmol/liter (polymerization volume), preferably, about 0 to 2 mmol/liter.

In the copolymerization of ethylene, an α-olefin having 3 to 20 carbon atoms and a branched chain polyene compound in the presence of the catalyst (a) composed of the soluble vanadium compound and the organoaluminum compound according to the present invention, the reaction is generally carried out at a temperature of −50° to 100° C., preferably, −30° to 80° C. and, still preferably, −20° to 60° C. under a pressure of 50 kg/cm$^2$ or less, preferably, 20 kg/cm$^2$ or less, but the pressure does not become zero.

In the copolymerization of ethylene, an α-olefin having 3 to 20 carbon atoms and a branched chain polyene compound in the presence of the catalyst (b) composed of the metallocene compound and either the organoaluminum oxy compound or the ionized ionic compound according to the present invention, the reaction is generally carried out at a temperature of −20° to 150° C., preferably, 0° to 120° C. and, still preferably, 0° to 100° C. under a pressure of 80 kg/cm$^2$ or less, preferably, 50 kg/cm$^2$ or less but the pressure does not become zero.

The reaction time (average residence time when the copolymerization is conducted according to the continuous process), depending on the catalyst concentration, the polymerization temperature and other conditions, generally ranges from 5 min to 5 hr, preferably, 10 min to 3 hr.

In the present invention, ethylene, an α-olefin having 3 to 20 carbon atoms and a branched chain polyene compound are fed into the polymerization system in amounts such that the above ethylene/α-olefin/nonconjugated polyene copolymer rubber of specified composition is obtained. A molecular weight modifier such as hydrogen may be used in the copolymerization.

As a result of the above copolymerization of ethylene, an α-olefin having 3 to 20 carbon atoms and a branched chain polyene compound, the ethylene/α-olefin/nonconjugated polyene copolymer rubber is obtained generally in the form of a polymer solution containing the same, which is treated by the customary procedure to thereby obtain the desired ethylene/α-olefin/nonconjugated polyene copolymer rubber.

The above process for producing the ethylene/α-olefin/nonconjugated polyene copolymer rubber (B) "unsaturated ethylenic copolymer" is described in detail in the specification of Japanese Patent Application No. 7(1995)-69986 filed by the same applicant as in the present application.

In the present invention, the ethylene/α-olefin/nonconjugated polyene copolymer rubber (B) is used in an amount of 90 to 5 parts by weight per 100 parts by weight of the sum of the crystalline polyolefin resin (A) and the ethylene/α-olefin/nonconjugated polyene copolymer rubber (B).

In the olefinic thermoplastic elastomer composition (1), the ethylene/α-olefin/nonconjugated polyene copolymer rubber (B) is used in an amount of 90 to more than 40 parts by weight, preferably, 80 to 45 parts by weight per 100 parts by weight of the sum of the crystalline polyolefin resin (A) and the ethylene/α-olefin/nonconjugated polyene copolymer rubber (B).

In the crystalline polyolefin resin composition (2), the ethylene/α-olefin/nonconjugated polyene copolymer rubber (B) is used in an amount of 5 to 40 parts by weight, preferably, 15 to 35 parts by weight per 100 parts by weight of the sum of the crystalline polyolefin resin (A) and the ethylene/α-olefin/nonconjugated polyene copolymer rubber (B).

Other Components

The olefinic thermoplastic elastomer composition (1) may comprise a softener (C) and/or an inorganic filler (D) in addition to the crystalline polyolefin resin (A) and the ethylene/α-olefin/nonconjugated polyene copolymer rubber (B).

Softeners generally employed in rubbers can be used as the softener (C).

Examples of suitable softeners include:

petrolic substances such as process oil, lubricating oil, paraffin, liquid paraffin, petroleum asphalt and vaseline;

coal tar materials such as coal tar and coal tar pitch;

fatty oils such as castor oil, linseed oil, rape-seed oil, soybean oil and coconut oil;

waxes such as tall oil, beeswax, carnauba wax and lanolin;

fatty acids and metal salts thereof such as ricinoleic acid, palmitic acid, stearic acid, barium stearate and calcium stearate;

synthetic polymers such as petroleum resin, coumarone-indene resin and atactic polypropylene;

esteric plasticizers such as dioctyl phthalate, dioctyl adipate and dioctyl sebacate; and microcrystalline wax, sub(factice), liquid polybutadiene, modified liquid polybutadiene and liquid thiokol.

In the olefinic thermoplastic elastomer composition (1), the softener (C) is used in an amount of up to 200 parts by weight, preferably, 2 to 100 parts by weight, still preferably, 5 to 80 parts by weight per 100 parts by weight of the sum of the crystalline polyolefin resin (A) and the ethylene/α-olefin/nonconjugated polyene copolymer rubber (B). When the softener (C) is used in the above amount, the obtained thermoplastic elastomer composition is excellent in fluidity at the time of molding and the molded item therefrom is free from deterioration of mechanical properties. When the amount of softener (C) exceeds 200 parts by weight in the present invention, the obtained thermoplastic elastomer composition tends to have deteriorated resistances to heat and heat aging.

Examples of suitable inorganic fillers (D) include calcium carbonate, calcium silicate, clay, kaolin, talc, silica, diatom earth, mica powder, asbestos, alumina, barium sulfate, aluminum sulfate, calcium sulfate, basic magnesium carbonate, molybdenum disulfide, graphite, glass fiber, glass bead, shirasu balloon, basic magnesium sulfate whisker, calcium titanate whisker and aluminum borate whisker.

In the olefinic thermoplastic elastomer composition (1), the inorganic filler (D) is used in an amount of up to 100 parts by weight, preferably, 2 to 50 parts by weight per 100 parts by weight of the sum of the crystalline polyolefin resin (A) and the ethylene/α-olefin/nonconjugated polyene copolymer rubber (B). When the amount of inorganic filler (D) exceeds 100 parts by weight in the present invention, the obtained thermoplastic elastomer composition tends to have deteriorated rubber elasticity and moldability.

In addition to the crystalline polyolefin resin (A), the ethylene/α-olefin/nonconjugated polyene copolymer rubber (B), the softener (C) and the inorganic filler (D), ethylene/propylene copolymer rubber (EPR) and ethylene/propylene/nonconjugated diene copolymer rubbers (EPDM) can be added to the above olefinic thermoplastic elastomer composition.

Examples of suitable ethylene/propylene/nonconjugated diene copolymer rubbers include ethylene/propylene/5-ethylidene-2-norbornene copolymer rubber and ethylene/propylene/dicyclopentadiene copolymer rubber.

It is preferred that the above ethylene/propylene copolymer rubber (EPR) and ethylene/propylene/nonconjugated diene copolymer rubbers (EPDM) be added in an amount of, preferably, 10 to 200 parts by weight and, more preferably, 10 to 150 parts by weight per 100 parts by weight of the sum of the crystalline polyolefin resin (A) and the ethylene/α-olefin/nonconjugated polyene copolymer rubber (B).

Moreover, the conventional heat stabilizer, antioxidant, weathering agent, antistatic agent and lubricant such as metallic soap or wax can be added to the olefinic thermoplastic elastomer in amounts such that they are not detrimental to the object of the present invention.

In addition to the crystalline polyolefin resin (A) and the ethylene/α-olefin/nonconjugated polyene copolymer rubber (B), the crystalline polyolefin resin composition (2) may contain 5 to 15 parts by weight, preferably, 5 to 10 parts by weight of an amorphous propylene/ethylene random copolymer (E) per 100 parts by weight of the sum of the components (A) and (B). This propylene/ethylene random copolymer (E) contains structural units derived from ethylene in an amount of 30 to 60 mol%, preferably, 35 to 45 mol%.

Further, this crystalline polyolefin resin composition may optionally contain the above inorganic filler in an amount of 5 to 20% by weight.

Still further, this crystalline polyolefin resin composition may contain a heat stabilizer, a nucleating agent such as an aluminum salt of an aromatic carboxylic acid, an aromatic phosphate salt or dibenzylidenesorbitol, an ultraviolet absorber, a lubricant, an antistatic agent, a flame retarder, a pigment, a dye and other polymers in amounts such that they are not detrimental to the object of the present invention.

Preparation of Composition

Among the olefinic thermoplastic elastomer compositions (1) which is an ethylene/α-olefin/nonconjugated polyene copolymer rubber composition of the present invention, the noncrosslinked thermoplastic elastomer composition is obtained by blending the above crystalline polyolefin resin (A) and ethylene/α-olefin/nonconjugated polyene copolymer rubber (B) optionally together with the softener (C) and/or inorganic filler (D) and subjecting the blend to dynamic heat treatment.

Further, the partially or entirely crosslinked olefinic thermoplastic elastomer composition of the present invention is obtained by blending the above crystalline polyolefin resin (A) and ethylene/α-olefin/nonconjugated polyene copolymer rubber (B) optionally together with the softener (C) and/or inorganic filler (D) and subjecting the blend to dynamic heat treatment in the presence of an organic peroxide as set forth below so as to effect partial or entire crosslinking.

The expression "dynamic heat treatment" used herein means milling in the molten state.

Examples of organic peroxides suitably employed in the present invention include dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxy benzoate, tert-butyl perbenzoate, tert-butylperoxy isopropyl carbonate, diacetyl peroxide, lauroyl peroxide and tert-butyl cumyl peroxide.

Of these, 2,5-dimethyl-2,5-di(tert-butylperoxy)hexane, 2,5-dimethyl-2,5-di(tert-butylperoxy)hexyne-3 and 1,3-bis(tert-butylperoxyisopropyl)benzene are preferred from the viewpoint of smell and resistance to scorch. 2,5-dimethyl-2,5-di(tert-butylperoxy)hexane is most preferred.

The above organic peroxide is added in an amount of 0.01 to 3 parts by weight, preferably, 0.02 to 1 part by weight per 100 parts by weight of the whole to be treated, i.e., the sum of the crystalline polyolefin resin (A) and the ethylene/α-olefin/nonconjugated polyene copolymer rubber (B). When the amount of the added organic peroxide is less than the above range, the obtained thermoplastic elastomer composition has low crosslinking degree, so that the heat resistance, tensile properties, elastic recovery and impact resilience thereof are not satisfactory. On the other hand, when this amount is greater than the above range, the obtained thermoplastic elastomer composition has such a high crosslinking degree that the moldability thereof is occasionally deteriorated.

In the crosslinking treatment with the use of the above organic peroxide, a peroxy crosslinking auxiliary such as sulfur, p-quinone dioxime, p,p'-dibenzoylquinone dioxime, N-methyl-N-4-dinitrosoaniline, nitrosobenzene, diphenylguanizine or trimethylolpropane-N,N'-m-phenylenedimaleimide, a polyfunctional methacrylate monomer such as divinylbenzene, triallyl cyanurate, ethylene glycol dimethacrylate, diethylene glycol dimethacrylate, polyethylene glycol dimethacrylate, trimethylolpropane trimethacrylate or allyl methacrylate and a polyfunctional vinyl monomer such as vinyl butyrate or vinyl stearate can be added to the composition.

The use of the above compound enables expecting a uniform and mild crosslinking reaction. In the present invention, divinylbenzene is most especially preferred. Divinylbenzene is easy to handle, has excellent compatibility with the crystalline polyolefin resin (A) and the ethylene/α-olefin/nonconjugated polyene copolymer rubber (B) as principal components of the above material to be crosslinked and exerts the action of solubilizing the organic peroxide to thereby function as an organic peroxide disperser, so that the crosslinking effect by the heat treatment is uniform with the result that a thermoplastic elastomer composition well balanced between fluidity and mechanical properties can be obtained.

The above compound such as the crosslinking auxiliary and the polyfunctional vinyl monomer is added in an amount of, generally, up to 2 parts by weight, preferably, 0.3 to 1 part by weight per 100 parts by weight of the whole to be treated.

A decomposition accelerator may be used for accelerating the decomposition of the organic peroxide.

Examples thereof include tertiary amines such as triethylamine, tributylamine and 2,4,6-tri(dimethylamino) phenol and naphthenates of aluminum, cobalt, vanadium, copper, calcium, zirconium, manganese, magnesium, lead, mercury, etc.

It is preferred that the dynamic heat treatment of the present invention be conducted in a hermetically sealed apparatus and in an atmosphere of an inert gas such as nitrogen or carbon dioxide gas. The temperature of the heat treatment ranges from the melting point of the crystalline polyolefin resin (A) to 300° C., generally, from 150° to 250° C., preferably, from 170° to 225° C. The heat treatment is conducted while milling for, generally, 1 to 20 min, preferably, 1 to 10 min under a shearing force of 10 to 100,000 sec$^{-1}$, preferably, 100 to 50,000 sec$^{-1}$ in terms of shearing rate.

The milling can be conducted by means of a mixing roll 20 mill, an intensive mixer (for example, Banbury mixer or kneader), a single or double screw extruder or the like. It is preferred that the milling be conducted in a hermetically sealed apparatus.

In the present invention, the noncrosslinked olefinic thermoplastic elastomer composition or the partially or entirely crosslinked olefinic thermoplastic elastomer composition comprising the crystalline polyolefin resin (A) and ethylene/α-olefin/nonconjugated polyene copolymer rubber (B) can be obtained by the above dynamic heat treatment.

In the present invention, the expression "thermoplastic elastomer composition having been partially crosslinked" means that the gel content of the composition as measured by the below specified method ranges, preferably, from 20 to less than 99.5% by weight, still preferably, from 45 to 98% by weight. On the other hand, the expression "thermoplastic elastomer composition having been entirely crosslinked" means that the gel content of the composition is at least 99.5% by weight.

Method of Measuring Gel Content 100 mg of specimen was harvested from the thermoplastic elastomer composition, cut into pieces each of 0.5 mm×0.5 mm×0.5 mm, immersed at 23° C. for 48 hr in 30 ml of cyclohexane in a hermetically sealed vessel, taken out onto a filter paper and dried at room temperature for 72 hr or over to a constant weight.

The "corrected final weight (Y)" is a value obtained by subtracting the weights of all cyclohexane insoluble components other than polymer components (fibrous or other fillers, pigment, etc.) and the weight of crystalline polyolefin resin (A) present in the specimen prior to the immersion in cyclohexane from the weight of above dried residue.

On the other hand, the weight of ethylene/α-olefin/nonconjugated polyene copolymer rubber (B) in the specimen is regarded as the "corrected initial weight (X)".

The gel content is calculated by the formula:

gel content (wt. %)=[corrected final weight (Y)/corrected initial weight (X)]×100.

The crystalline polyolefin resin composition as an ethylene/α-olefin/nonconjugated polyene copolymer rubber composition according to the present invention can be obtained by simultaneously or sequentially feeding the above components to a milling device such as Henschel mixer, twin-cylinder mixer, tumbler blender or ribbon blender, milling them to a mixture and melt kneading the mixture by means of a single or multiple screw extruder, a kneader, a Banbury mixer, etc.

The use of a device having excellent kneading capability such as multiple screw extruder, kneader or Banbury mixer among the above melt kneaders enables obtaining a crystalline polyolefin resin composition of high quality in which the various components are uniformly dispersed.

EFFECT OF THE INVENTION

The ethylene/α-olefin/nonconjugated polyene copolymer rubber composition according to the present invention enables providing a molding being excellent in low temperature properties.

Specifically, the olefinic thermoplastic elastomer composition (1) as an ethylene/α-olefin/nonconjugated polyene copolymer rubber composition according to the present invention, even when being of the noncrosslinked type, enables providing a molding being excellent in tensile strength, elongation at break, rubber properties, heat resistance and low temperature properties as compared with those of the conventional noncrosslinked olefinic thermoplastic elastomers.

This olefinic thermoplastic elastomer composition, especially when being partially or entirely crosslinked, enables providing a molding which is superior to the conventional vulcanized rubbers in low temperature properties, tensile strength, elongation at break and rubber properties.

The crystalline polyolefin resin composition (2) enables providing a polyolefin molding being excellent in not only rigidity and heat resistance but also impact resistance, especially, at low temperatures.

EXAMPLE

The present invention will further be illustrated with reference to the following examples which in no way limit the scope of the invention.

In the following Examples and Comparative Examples, the composition evaluation tests were carried out in the following manners.
[Property measuring method]
(1) tensile strength The tensile strength at break was measured in accordance with Japanese Industrial Standard K 6301 in which the specimen was pulled at a speed of 200 mm/min.
(2) elongation at break The elongation at break was measured in accordance with Japanese Industrial Standard K 6301 in which the specimen was pulled at a speed of 200 mm/min.
(3) permanent set The permanent set was measured in accordance with Japanese Industrial Standard K 6301 in which the specimen was retained at a length corresponding to an elongation of 100%.
(4) MFR The MFR was measured in accordance with ASTM D1238 at 230° C. under 2.16 kg.
(5) flexural modulus (FM)

The flexural modulus (FM) was measured by conducting a flexural test in accordance with ASTM D790 in which:

specimen: 12.7 mm in width, 6.4 mm in thickness and 127 mm in length, span: 100 mm, and flexural speed: 2 mm/min.
(6) Izod impact strength (IZ)

The Izod impact strength (IZ) was measured by conducting an impact test in accordance with ASTM D256 in which:

temperature: −30° C., specimen: 12.7 mm in width, 6.4 mm in thickness and 64 mm in length, and notch: made by machining.
[With respect to noncrosslinked thermoplastic elastomer composition]

Referential Example 1

[Preparation of catalyst]

In argon atmosphere, 43 mg (0.33 mmol) of anhydrous cobalt chloride (II), 263 mg (0.66 mmol) of 1,2-bis(diphenylphosphino)ethane and 23 ml of anhydrous decane were put in a 50 ml flask having a stirrer placed therein and stirred at 25° C. for 2 hr.

Thereafter, 17 ml of a toluene solution containing triethylaluminum in a concentration of 1 mol/liter (triethylaluminum 17 mmol) was added at 25° C. and stirred for 2 hr. thereby obtaining a catalyst.

[Synthesis of 4-ethylidene-8-methyl-1,7-nonadiene (EMN)]

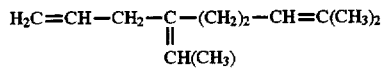

100 g (734 mmol) of 7-methyl-3-methylene-1,6-octadiene (β-myrcene) and the whole amount of the above prepared catalyst were put in a 300 ml stainless steel (SUS 316) autoclave in argon atmosphere and hermetically sealed.

Subsequently, an ethylene cylinder was directly connected to the autoclave and ethylene was introduced and an intraautoclave pressure was raised to 35 kg/cm$^2$.

Thereafter, the autoclave was heated to 95° C. and the consumed ethylene was intermittently supplemented 5 times. Reaction was effected for a total of 15 hr.

After the completion of the reaction, the autoclave was cooled and opened and the thus obtained reaction mixture was poured into 100 ml of water to thereby effect separation into an organic layer and a water layer. The organic layer was recovered, evaporated by means of an evaporator to thereby remove low boiling point matter and subjected to a 20-plate vacuum superfractionation.

Thus, 83 g of the desired EMN was obtained (yield: 69% and β-myrcene conversion: 90%). A reaction byproduct of 5,9-dimethyl-1,4,8-decatriene was formed in an amount of 16 g (yield: 13%).

The analytical results of the thus obtained 4-ethylidene-8-methyl-1,7-nonadiene (EMN) are as follows:

(1) boiling point: 103°–105° C./30 mmHg,
(2) GC-MS (gas chromatography-mass spectrometry):
m/z 164 (M$^+$molecular ion peak),
149, 123, 93, 79, 41, 27
gas chromatography conditions:
column: J & W Scientific capillary column DB-1701 0.25 mm×30 m,
vaporization temperature: 250° C.,
column temperature: held at 60° C. for 5 min and raised at a rate of 10° C./min to 200° C.
(3) infrared absorption spectrum (neat)
absorption peaks
3080 cm$^{-1}$, 2975 cm$^{-1}$, 2925 cm$^{-1}$,
2825 cm$^{-1}$, 1670 cm$^{-1}$, 1640 cm$^{-1}$,
1440 cm$^{-1}$, 1380 cm$^{-1}$, 1235 cm$^{-1}$,
1110 cm$^{-1}$, 910 cm$^{-1}$, 830 cm$^{-1}$
(4) $^1$H-NMR spectrum (solvent: CDCl$_3$).
The absorption peaks are listed as follows.

TABLE 1

| ppm (δ) | (number of proton, peak) |
|---|---|
| 1.60 | (6 H, singlet) |
| 1.70 | (3 H, singlet) |
| 2.00 | (4 H, singlet) |
| 2.80 | (2 H, doublet, J = 7 Hz) |
| 5.9–6.5 | (4 H, multiplet) |
| 6.7 | (1 H, multiplet) |

[Preparation of ethylene/α-olefin/nonconjugated polyene copolymer rubber]

Copolymerization of ethylene, propylene and the above 4-ethylidene-8-methyl-1,7-nonadiene (EMN) was continuously carried out with the use of a 15 -liter polymerization reactor equipped with an agitating blade.

Dehydrated and purified hexane, a hexane solution of bis (1,3-dimethylcyclopentadienyl)zirconium dichloride (concentration: 0.05 mmol/liter), a hexane solution of triisobutylaluminum (concentration: 20 mmol/liter), a hexane slurry of methylaluminooxane (3 milligram atom/liter in terms of aluminum atoms) and a hexane solution of EMN (concentration: 0.20 liter/liter) were fed into the polymerization reactor from an upper part thereof at respective rates of 3 liter/hr, 0.1 liter/hr, 0.2 liter/hr, 0.5 liter/hr and 1.2 liter/hr.

Further, ethylene and propylene were fed at respective rates of 260 liter/hr and 540 liter/hr and hydrogen was fed at a rate such that the concentration thereof in the gas phase portion was held at 0.004 mol% into the polymerization reactor from an upper part thereof in a continuous manner. This copolymerization reaction was conducted at 50° C.

The resultant polymer solution was withdrawn from the polymerization reactor from its lower part, and a small amount of methanol was added to terminate the popolymerization reaction. A copolymer was separated from the solvent by steam stripping and dried at 100° C. in vacuum (100 mmHg) for 24 hr.

Thus, there was obtained the above ethylene/propylene/EMN copolymer rubber at a rate of 240 g/hr.

The obtained ethylene/propylene/EMN copolymer rubber (B-1) had a molar ratio of ethylene units to propylene units (ethylene units/propylene units) of 80/20, an iodine value of 11 and an intrinsic viscosity [η] measured in 135° C. decalin of 2.8 dl/g.

Referential Examples 2 and 3

The same procedure as in Referential Example 1 was repeated to thereby obtain ethylene/α-olefin/EMN copolymer rubbers (B-2 and B-3) specified in Table 2.

TABLE 2

|  | Ref. Ex. 1 | Ref. Ex. 2 | Ref. Ex. 3 |
|---|---|---|---|
| copolymer rubber | B-1 | B-2 | B-3 |
| α-olefin | propylene | i-butene | 1-octene |
| ethylene/α-olefin (mol. ratio) | 80/20 | 79/21 | 82/18 |
| [η] (dl/g) | 2.8 | 2.7 | 2.9 |
| iodine value | 11 | 13 | 12 |

Example 1

50 parts by weight of the above ethylene/propylene/EMN copolymer rubber (B-1) obtained in Referential Example 1 was milled together with 50 parts by weight of propylene homopolymer (A-1) of 11 g/10 min in MFR (ASTM D1238-65T, 230° C.) and 0.91 g/cm$^3$ in density at 180° C. for 10 min by means of Banbury mixer. The thus obtained blend was passed through open rolls and cut by means of a sheet cutter, thereby obtaining rectangular pellets.

The rectangular pellets were injection molded into prescribed specimens and the properties thereof (tensile strength, elongation at break and permanent set) were measured in accordance with the above methods.

The results are given in Table 3.

Example 2

An olefinic thermoplastic elastomer composition was prepared and the properties thereof were measured in the same manner as in Example 1, except that the ethylene/1- butene/EMN copolymer rubber (B-2) obtained in Referential Example 2 was employed in place of the ethylene/propylene/EMN copolymer rubber (B-1).

The results are given in Table 3.

Example 3

An olefinic thermoplastic elastomer composition was prepared and the properties thereof were measured in the same manner as in Example 1, except that the ethylene/1-octene/EMN copolymer rubber (B-3) obtained in Referential Example 3 was employed in place of the ethylene/propylene/EMN copolymer rubber (B-1).

The results are given in Table 3.

Comparative Example 1

An olefinic thermoplastic elastomer composition was prepared and the properties thereof were measured in the same manner as in Example 1, except that ethylene/propylene/5-ethylidene-2-norbornene copolymer rubber (EPDM-1) having an ethylene unit content of 80 mol%, an iodine value of 12 and an intrinsic viscosity [η] of 2.8 dl/g was employed in place of the ethylene/propylene/EMN copolymer rubber (B-1).

The results are given in Table 3.

TABLE 3

|  | Ex. 1 | Ex. 2 | Ex. 3 | comp. Ex. 1 |
| --- | --- | --- | --- | --- |
| tensile strength [kg/cm$^2$] | 105 | 120 | 115 | 73 |
| elongation at break [%] | 520 | 510 | 480 | 420 |
| permanent set [%] | 28 | 30 | 33 | 52 |

Example 4

An olefinic thermoplastic elastomer composition was prepared and the properties thereof were measured in the same manner as in Example 1, except that the amounts of blended ethylene/propylene/EMN copolymer rubber (B-1) and propylene homopolymer (A-1) were changed to 75 and 25 parts by weight, respectively.

The results are given in Table 4.

Comparative Example 2

An olefinic thermoplastic elastomer composition was prepared and the properties thereof were measured in the same manner as in Example 4, except that the same ethylene/propylene/5-ethylidene-2-norbornene copolymer rubber (EPDM-1) as employed in Comparative Example 1 was employed in place of the ethylene/propylene/EMN copolymer rubber (B-1).

The results are given in Table 4.

TABLE 4

|  | Example 4 | Comp. Ex. 2 |
| --- | --- | --- |
| tensile strength [kg/cm$^2$] | 44 | 25 |
| elongation at break [%] | 520 | 410 |
| permanent set [%] | 10 | 18 |

Example 5

An olefinic thermoplastic elastomer composition was prepared and the properties thereof were measured in the same manner as in Example 1, except that 40 parts by weight of mineral oil softener [PW-380 (trade name) produced by Idemitsu Kosan Co., Ltd.] and 20 parts by weight of talc [ET-5 (trade name) produced by Matsumura Sangyo Co., Ltd.] were blended together in addition to the ethylene/propylene/EMN copolymer rubber (B-1) and propylene homopolymer (A-1).

The results are given in Table 5.

Comparative Example 3

An olefinic thermoplastic elastomer composition was prepared and the properties thereof were measured in the same manner as in Example 5, except that the same ethylene/propylene/5-ethylidene-2-norbornene copolymer rubber (EPDM-1) as employed in Comparative Example 1 was employed in place of the ethylene/propylene/EMN copolymer rubber (B-1).

The results are given in Table 5.

TABLE 5

|  | Example 5 | Comp. Ex. 3 |
| --- | --- | --- |
| tensile strength [kg/cm$^2$] | 174 | 115 |
| elongation at break [%] | 540 | 420 |
| permanent set [%] | 28 | 53 |

[With respect to partially or entirely crosslinked thermoplastic elastomer composition]

Example 6

50 parts by weight of the above ethylene/propylene/EMN copolymer rubber (B-1) obtained in Referential Example 1 and 50 parts by weight of the same propylene homopolymer (A-1) as employed in Example 1 were provided, and 0.1 part by weight of organic peroxide 2,5-dimethyl-2,5-di(tert-butylperoxy)hexyne-3 and 0.3 part by weight of divinylbenzene (DVB) were added thereto and satisfactorily mixed by means of Henschel mixer. The resultant mixture was milled by means of Banbury mixer at 180° C. for 10 min. The thus obtained blend was passed through open rolls and cut by means of a sheet cutter, thereby obtaining rectangular pellets.

The rectangular pellets were injection molded into prescribed specimens and the properties thereof were measured in accordance with the above methods.

The results are given in Table 6.

Example 7

An olefinic thermoplastic elastomer composition was prepared and the properties thereof were measured in the same manner as in Example 6, except that ethylene/1-butene/EMN copolymer rubber (B-2) was employed in place of the ethylene/propylene/EMN copolymer rubber (B-1).

The results are given in Table 6.

Example 8

An olefinic thermoplastic elastomer composition was prepared and the properties thereof were measured in the same manner as in Example 6, except that ethylene/1-octene/EMN copolymer rubber (B-3) was employed in place of the ethylene/propylene/EMN copolymer rubber (B-1).

The results are given in Table 6.

Comparative Example 4

An olefinic thermoplastic elastomer composition was prepared and the properties thereof were measured in the same manner as in Example 6, except that the same ethylene/propylene/5-ethylidene-2-norbornene copolymer rubber (EPDM-1) as employed in Comparative Example 1 was employed in place of the ethylene/propylene/EMN copolymer rubber (B-1).

The results are given in Table 6.

TABLE 6

|  | Ex. 6 | Ex. 7 | Ex. 8 | comp. Ex. 4 |
|---|---|---|---|---|
| tensile strength [kg/cm$^2$] | 230 | 250 | 240 | 145 |
| elongation at break [%] | 580 | 560 | 600 | 510 |
| permanent set [%] | 26 | 22 | 23 | 58 |
| gel content [wt. %] | 68 | 72 | 73 | 37 |

Example 9

An olefinic thermoplastic elastomer composition was prepared and the properties thereof were measured in the same manner as in Example 6, except that the amounts of blended ethylene/propylene/EMN copolymer rubber (B-1) and propylene homopolymer (A-1) were changed to 75 and 25 parts by weight, respectively.

The results are given in Table 7.

Comparative Example 5

An olefinic thermoplastic elastomer composition was prepared and the properties thereof were measured in the same manner as in Example 9, except that the same ethylene/propylene/5-ethylidene-2-norbornene copolymer rubber (EPDM-1) as employed in Comparative Example 1 was employed in place of the ethylene/propylene/EMN copolymer rubber (B-1).

The results are given in Table 7.

TABLE 7

|  | Example 9 | Comp. Ex. 5 |
|---|---|---|
| tensile strength [kg/cm$^2$] | 67 | 38 |
| elongation at break [%] | 660 | 440 |
| permanent set [%] | 5 | 13 |
| gel content [wt. %] | 73 | 33 |

Example 10

An olefinic thermoplastic elastomer composition was prepared and the properties thereof were measured in the same manner as in Example 6, except that 40 parts by weight of mineral oil softener [PW-380 (trade name) produced by Idemitsu Kosan Co., Ltd.] and 20 parts by weight of talc [ET-5 (trade name) produced by Matsumura Sangyo Co., Ltd.] were blended together in addition to the ethylene/propylene/EMN copolymer rubber (B-1) and propylene homopolymer (A-1).

The results are given in Table 8.

Comparative Example 6

An olefinic thermoplastic elastomer composition was prepared and the properties thereof were measured in the same manner as in Example 10, except that the same ethylene/propylene/5-ethylidene-2-norbornene copolymer rubber (EPDM-1) as employed in Comparative Example 1 was employed in place of the ethylene/propylene/EMN copolymer rubber (B-1).

The results are given in Table 8.

TABLE 8

|  | Example 10 | Comp. Ex. 6 |
|---|---|---|
| tensile strength [kg/cm$^2$] | 245 | 175 |
| elongation at break [%] | 630 | 550 |
| permanent set [%] | 24 | 45 |
| gel content [wt. %] | 71 | 39 |

[With respect to crystalline polyolefin resin composition]

Referential Example 4

The same procedure as in Referential Example 1 was repeated to thereby obtain ethylene/α-olefin/EMN copolymer rubber (B-4) specified in Table 9.

TABLE 9

|  | Ref. Ex. 1 | Ref. Ex. 2 | Ref. Ex. 4 |
|---|---|---|---|
| copolymer rubber | B-1 | B-2 | B-4 |
| α-olefin | propylene | 1-butene | 1-octene |
| ethylene/α-olefin (mol. ratio) | 80/20 | 79/21 | 80/20 |
| [η] (dl/g) | 2.8 | 2.6 | 2.8 |
| iodine value | 11 | 13 | 12 |

Example 11

75 parts by weight of crystalline propylene homopolymer (A-2) of 25 g/10 min in MFR and 25 parts by weight of the above ethylene/propylene/EMN copolymer rubber (B-1) obtained in Referential Example 1 were milled together and molded by an injection molding machine (resin temperature: 200° C. and mold temperature: 40° C.) into ASTM specimens for the measurement of the flexural modulus and Izod impact strength of crystalline polypropylene resin composition. The above flexural and impact tests were performed of the obtained specimens.

The results are given in Table 10.

Example 12

A polypropylene resin composition was prepared and the properties thereof were measured in the same manner as in Example 11, except that the ethylene/1-butene/EMN copolymer rubber (B-2) obtained in Referential Example 2 was employed in place of the rubber (B-1).

The results are given in Table 10.

Example 13

A polypropylene resin composition was prepared and the properties thereof were measured in the same manner as in Example 11, except that the ethylene/1-octene/EMN copolymer rubber (B-4) obtained in Referential Example 4 was employed in place of the rubber (B-1).

The results are given in Table 10.

Comparative Example 7

A polypropylene resin composition was prepared and the properties thereof were measured in the same manner as in Example 11, except that ethylene/propylene/5-ethylidene-2-norbornene copolymer rubber (EPDM-2) having an ethylene unit content of 80 mol%, an iodine value of 12 and an intrinsic viscosity [η] of 2.7 dl/g as measured in 135° C. decalin was employed in place of the ethylene/propylene/ EMN copolymer rubber (B-1).

The results are given in Table 10.

TABLE 10

|  | Ex. 11 | Ex. 12 | Ex. 13 | Comp. Ex 7 |
|---|---|---|---|---|
| MFR [g/10 min] | 14 | 15 | 13 | 14 |
| IZ [kg · cm/cm] | 18 | 24 | 27 | 13 |
| FM [kg/cm²] | 11000 | 12000 | 11500 | 10700 |

Example 14

A polypropylene resin composition was prepared and the properties thereof were measured in the same manner as in Example 11, except that the amounts of blended crystalline propylene homopolymer (A-2) and ethylene/propylene/ EMN copolymer rubber (B-1) were changed to 60 and 20 parts by weight, respectively, and that further 20 parts by weight of talc having an average particle size of 2.5 μm was added.

The results are given in Table 11.

Comparative Example 8

A polypropylene resin composition was prepared and the properties thereof were measured in the same manner as in Example 14, except that the same EPDM-2 as employed in Comparative Example 7 was employed in place of the ethylene/propylene/EMN copolymer rubber (B-1).

The results are given in Table 11.

TABLE 11

|  | Ex. 14 | Comp. Ex. 8 |
|---|---|---|
| MFR [g/10 min] | 16 | 14 |
| IZ [kg · cm/cm] | 30 | 22 |
| FM [kg/cm²] | 23000 | 23000 |

Example 15

A polypropylene resin composition was prepared and the properties thereof were measured in the same manner as in Example 11, except that the amount of blended ethylene/ propylene/EMN copolymer rubber (B-1) was changed to 15 parts by weight and that amorphous propylene/ethylene random copolymer (C-1) having an ethylene unit content of 41 mol% and an intrinsic viscosity [η] of 3.0 dl/g as measured in 135° C. decalin was added in an amount of 10 parts by weight [11.1 parts by weight per 100 parts by weight of the sum of the components (A-2) and (B-1)].

The results are given in Table 12.

Comparative Example 9

A polypropylene resin composition was prepared and the properties thereof were measured in the same manner as in Example 15, except that the same EPDM-2 as employed in Comparative Example 7 was employed in place of the ethylene/propylene/EMN copolymer rubber (B-1).

The results are given in Table 12.

TABLE 12

|  | Ex. 15 | Comp. Ex. 9 |
|---|---|---|
| MFR [g/10 min] | 15 | 14 |
| IZ [kg · cm/cm] | 18 | 10 |
| FM [kg/cm²] | 12000 | 11500 |

Example 16

A polypropylene resin composition was prepared and the properties thereof were measured in the same manner as in Example 11, except that highly crystalline propylene homopolymer (A-3) of 15 g/10 min in MFR and 164° C. in melting point (Tm) measured by DSC was employed in place of the crystalline propylene homopolymer (A-2).

The results are given in Table 13.

Example 17

A polypropylene resin composition was prepared and the properties thereof were measured in the same manner as in Example 16, except that the amount of blended ethylene/ propylene/EMN copolymer rubber (B-1) was changed to 20 parts by weight and that ethylene homopolymer (A-4) [MFR (ASTM D1238): 13 g/10 min and density (ASTM D1505): 0.965 g/cm³] was added in an amount of 5 parts by weight.

The results are given in Table 13.

Example 18

A polypropylene resin composition was prepared and the properties thereof were measured in the same manner as in Example 11, except that propylene/ethylene block copolymer (A-5) of 22 g/10 min in MFR, 8 wt.% in the content of structural units derived from ethylene, 11 wt.% in the content of matter soluble in n-decane at ordinary temperature and 2.9 dl/g in the intrinsic viscosity [η] of ordinary temperature n-decane soluble matter as measured in 135° C. decalin was employed in place of the crystalline propylene homopolymer (A-2).

The results are given in Table 13.

TABLE 13

|  | Ex. 16 | Ex. 17 | Ex. 18 |
|---|---|---|---|
| MFR [g/10 min] | 14 | 14 | 15 |
| IZ [kg · cm/cm] | 19 | 18 | 60 |
| FM [kg/cm²] | 15000 | 13500 | 13500 |

What is claimed is:

1. An ethylene/α-olefin/nonconjugated polyene copolymer rubber composition comprising 10 to 95 parts by weight of a crystalline polyolefin resin (A) and 90 to 5 parts by weight of an ethylene/α-olefin/nonconjugated polyene copolymer rubber (B) in which the sum of components (A) and (B) is 100 parts by weight, said ethylene/α-olefin/nonconjugated polyene copolymer rubber (B) being composed of ethylene, an α-olefin having 3 to 20 carbon atoms and at least one branched chain polyene compound represented by the following general formula [I]:

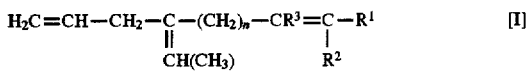

wherein n is an integer of 1 to 5,

R$^1$ represents an alkyl group having 1 to 5 carbon atoms, and each of R$^2$ and R$^3$ independently represents a hydrogen atom or an alkyl group having 1 to 5 carbon atoms, and said ethylene/α-olefin/nonconjugated polyene copolymer rubber (B) being characterized by:

(i) having a molar ratio of ethylene to the α-olefin having 3 to 20 carbon atoms (ethylene/α-olefin) of 40/60 to 95/5, (ii) exhibiting an iodine value of 1 to 40, and (iii) having an intrinsic viscosity [η] measured in 135° C. decalin which satisfies the inequality:

$$0.8 \text{ dl/g} < [\eta] < 5.0 \text{ dl/g}.$$

2. The ethylene/α-olefin/nonconjugated polyene copolymer rubber composition as claimed in claim 1, which is an olefinic thermoplastic elastomer composition comprising 10 to less than 60 parts by weight of a crystalline polyolefin resin (A) and 90 to more than 40 parts by weight of an ethylene/α-olefin/nonconjugated polyene copolymer rubber (B) in which the sum of components (A) and (B) is 100 parts by weight, said ethylene/α-olefin/nonconjugated polyene copolymer rubber (B) being composed of ethylene, an α-olefin having 3 to 20 carbon atoms and at least one branched chain polyene compound represented by said general formula [I], and said ethylene/α-olefin/nonconjugated polyene copolymer rubber (B) being characterized by:

(i) having a molar ratio ethylene to the α-olefin having 3 to 20 carbon atoms (ethylene/α-olefin) of 40/60 to 95/5, (ii) exhibiting an iodine value of 1 to 40, and (iii) having an intrinsic viscosity [η] measured in 135° C. decalin which satisfies the inequality:

$$0.8 \text{ dl/g} < [\eta] < 5.0 \text{ dl/g}.$$

3. The ethylene/α-olefin/nonconjugated polyene copolymer rubber composition as claimed in claim 2, which further comprises 2 to 100 parts by weight of a softener (C) and/or 2 to 50 parts by weight of an inorganic filler (D) per 100 parts by weight of the sum of the crystalline polyolefin resin (A) and the ethylene/α-olefin/nonconjugated polyene copolymer rubber (B).

4. The ethylene/α-olefin/nonconjugated polyene copolymer rubber composition as claimed in claim 2, which is a noncrosslinked olefinic thermoplastic elastomer composition.

5. The ethylene/α-olefin/nonconjugated polyene copolymer rubber composition as claimed in claim 2, which is a partially or entirely crosslinked olefinic thermoplastic elastomer composition.

6. The ethylene/α-olefin/nonconjugated polyene copolymer rubber composition as claimed in claim 1, which is a crystalline polyolefin resin composition comprising 95 to 60 parts by weight of a crystalline polyolefin resin (A) and 5 to 40 parts by weight of an ethylene/α-olefin/nonconjugated polyene copolymer rubber (B) in which the sum of components (A) and (B) is 100 parts by weight, said ethylene/α-olefin/nonconjugated polyene copolymer rubber (B) being composed of ethylene, an α-olefin having 3 to 20 carbon atoms and at least one branched chain polyene compound represented by the general formula [I], and said ethylene/α-olefin/nonconjugated polyene copolymer rubber (B) being characterized by:

(i) having a molar ratio ethylene to the α-olefin having 3 to 20 carbon atoms (ethylene/α-olefin) of 40/60 to 95/5, (ii) exhibiting an iodine value of 1 to 40, and (iii) having an intrinsic viscosity [η] measured in 135° C. decalin which satisfies the inequality:

$$0.8 \text{ dl/g} < [\eta] < 5.0 \text{ dl/g}.$$

7. The ethylene/α-olefin/nonconjugated polyene copolymer rubber composition as claimed in claim 6, wherein the crystalline polyolefin resin (A) is a polypropylene resin.

8. The ethylene/α-olefin/nonconjugated polyene copolymer rubber composition as claimed in claim 6, which further comprises 5 to 15 parts by weight of an amorphous propylene/ethylene random copolymer (E) per 100 parts by weight of the sum of the crystalline polyolefin resin (A) and the ethylene/α-olefin/nonconjugated polyene copolymer rubber (B).

* * * * *